(12) United States Patent
Dastidar (10) Patent No.: US 7,299,390 B1
(45) Date of Patent: Nov. 20, 2007

(54) APPARATUS AND METHOD FOR ENCRYPTING SECURITY SENSITIVE DATA

(75) Inventor: Jayabrata Ghosh Dastidar, San Jose, CA (US)

(73) Assignee: Altera Corporation, San Jose, CA (US)

( * ) Notice: Subject to any disclaimer, the term of this patent is extended or adjusted under 35 U.S.C. 154(b) by 153 days.

(21) Appl. No.: 11/297,948

(22) Filed: Dec. 9, 2005

(51) Int. Cl.
*G01R 31/28* (2006.01)
*H04L 9/00* (2006.01)

(52) U.S. Cl. .................. 714/726; 714/724; 713/176
(58) Field of Classification Search .................. None
See application file for complete search history.

(56) References Cited

U.S. PATENT DOCUMENTS

| | | | |
|---|---|---|---|
| 5,126,950 A * | 6/1992 | Rees et al. .................. | 716/4 |
| 6,424,926 B1 * | 7/2002 | Mak .......................... | 702/117 |
| 7,228,474 B2 * | 6/2007 | Williams et al. ............ | 714/726 |
| 2003/0131295 A1 * | 7/2003 | Berry et al. ................ | 714/726 |
| 2004/0133832 A1 * | 7/2004 | Williams et al. ............ | 714/726 |

* cited by examiner

*Primary Examiner*—Phung My Chung
(74) *Attorney, Agent, or Firm*—Martine Penilla & Gencarella, LLP (57) ABSTRACT

An interlinked chain of exclusive-or (XOR) logic gates and registers is formed by connecting a first input of each XOR logic gate to an output of a preceding register, and by connecting an input of each register to an output of a preceding XOR logic gate. Each XOR logic gate has a second input connected to receive an output from a respective data source. The interlinked chain further includes an originating XOR logic gate having its first input connected to an output of an originating data source rather than to a preceding register. The interlinked chain includes a terminating XOR logic gate having an output defined to provide an encrypted signature for the various data source outputs. Destructible bypass connections are provided to enable direct access to each data source in a secure environment and permanently disable direct access to each data source prior to release from the secure environment.

20 Claims, 8 Drawing Sheets

Scan Signature

| A | B | C | A XOR B XOR C |
|---|---|---|---|
| 0 | 0 | 0 | 0 |
| 0 | 0 | 1 | 1 |
| 0 | 1 | 0 | 1 |
| 0 | 1 | 1 | 0 |
| 1 | 0 | 0 | 1 |
| 1 | 0 | 1 | 0 |
| 1 | 1 | 0 | 0 |
| 1 | 1 | 1 | 1 |

APPARATUS AND METHOD FOR ENCRYPTING SECURITY SENSITIVE DATA

BACKGROUND

In modern electronic devices circuitry is often defined with scan capability. More specifically, a particular portion of circuitry can be defined to have a scan input chain and a scan output chain. Each of the scan input and output chains is defined by a set of serially connected registers, wherein each register is typically defined to store a single bit signal. Scan input data can be clocked through the various registers in the scan input chain. The scan input data represents binary input signals for the portion of circuitry to be tested by the scan input and output chains. Once the scan input chain is loaded, the scan input data is clocked through the circuitry to be tested. Various output signals generated by the circuitry based on the scan input data are then clocked out to the registers that define the scan output chain. Then, the scan output data is clocked out in a serial manner to be compared with expected scan output data. If the scan output data matches expectation, the circuitry is considered to be operating correctly. If the scan output data does match expectation, the circuitry is considered to be malfunctioning.

With direct access to the scan output chain, a malevolent entity may be able to decipher the logical function of a portion of circuitry by analyzing the scan output data resulting from a large number of scan input data combinations. The malevolent entity could then exploit the deciphered logical function of the circuitry. For example, if the circuitry in question were defined to provide a security feature, the deciphered logical function of the circuitry could be used by the malevolent entity to bypass the security feature.

Additionally, in the context of a programmable logic device (PLD), circuitry of the PLD is configured based on configuration data stored in a configuration memory. The configuration data is used to control a number of configuration devices within the PLD. A controlled state of the various configuration devices serves to establish circuitry connectivity and associated logic functions within the PLD. Thus, with direct access to the configuration data and knowledge of the underlying PLD structure, a malevolent entity may be able to ascertain the logic function of the configured PLD. The malevolent entity could then exploit the deciphered logic function of the configured PLD.

In view of the foregoing, a solution is needed to ensure that security sensitive data, such as scan output data and PLD configuration data, is protected from direct access and exploitation. Additionally, the solution for protecting the security sensitive data should not interfere with legitimate access to the security sensitive data.

SUMMARY

In one embodiment, a circuit is disclosed for encrypting scan test data. The circuit includes an interlinked chain of exclusive-or (XOR) logic gates and registers. The interlinked chain of XOR logic gates and registers is formed by connecting a first input of each XOR logic gate to an output of a preceding register, and by connecting an input of each register to an output of a preceding XOR logic gate. Each XOR logic gate also has a second input connected to receive an output from a respective scan output chain. The interlinked chain of XOR logic gates and registers further includes an originating XOR logic gate having its first input connected to an output of an originating scan output chain rather than to a preceding register. Additionally, the interlinked chain of XOR logic gates and registers includes a terminating XOR logic gate having an output defined to provide scan signature data. The scan signature data represents an encrypted version of scan test data output by each scan output chain.

Each XOR logic gate and register within the interlinked chain of XOR logic gates and registers of the present embodiment is defined to transmit a single bit signal on each of their respective inputs and outputs in accordance with a common clock signal. Also, each of the plurality of scan output chains in the present embodiment can be associated with a portion of circuitry in a programmable logic device (PLD). Therefore, each of the plurality of scan output chains and its associated portion of circuitry has a corresponding scan input chain. The scan input and output chains enable testing of their associated portion of circuitry within the PLD.

In another aspect of the present embodiment, the output of the terminating XOR logic gate is connected to a third input of at least one XOR logic gate within the interlinked chain of XOR logic gates and registers. Thus, the scan signature data provided from the terminating XOR logic gate is provided as a feedback signal to the third input of at least one XOR logic gate within the interlinked chain of XOR logic gates and registers. Connection of the scan signature data as a feedback signal further increases a difficulty level associated with deciphering the various scan output chain output signals that are used to generate the encrypted scan signature data.

In another aspect of the present embodiment, a plurality of destructible bypass connections can be included with the circuit for encrypting scan test data. Each of the plurality of destructible bypass connections extends from the output of a respective one of the plurality of scan output chains to an output pin. Therefore, the plurality of destructible bypass connections enables direct access to the scan test data output by each scan output chain. In one embodiment, each of the destructible bypass connections is defined to include a fuse. The fuse in an intact state enables data transmission through the destructible bypass connection. The fuse in a blown state disables data transmission through the destructible bypass connection. Each fuse can be blown in a number of ways. For example, each fuse can be blown either by applying a sufficient current to the destructible bypass connection that includes the fuse, or through the appropriate application of a laser to the fuse. The plurality of destructible bypass connections can be destroyed prior to a non-secure release of the corresponding device. Upon destruction of the plurality of destructible bypass connections, the overall functionality of the device can continue to be checked using the scan signature data provided by the interlinked chain of XOR logic gates and registers.

In another embodiment, a circuit is disclosed for encrypting configuration data of a PLD. The circuit includes an interlinked chain of XOR logic gates and registers. Within the interlinked chain, a first input of each XOR logic gate is connected to an output of a preceding register. Also within the interlinked chain, an input of each register is connected to an output of a preceding XOR logic gate. Each XOR logic gate in the interlinked chain also has a second input connected to receive an output from a respective configuration memory cell array defined within the PLD. The interlinked chain also includes an originating XOR logic gate having its first input connected to an output of an originating configuration memory cell array rather than to a preceding register. Additionally, the interlinked chain includes a terminating XOR logic gate having an output defined to provide configuration signature data. The configuration signature data represents an encrypted version of configuration data stored in each cell of the configuration memory.

As with the circuit for encrypting scan test data in the previous embodiment, the circuit for encrypting PLD configuration data of the present embodiment is defined such that each XOR logic gate and register within the interlinked chain of XOR logic gates and registers transmits a single bit signal on each of their respective inputs and outputs in accordance with a common clock signal. Also, in another aspect of the present embodiment, the circuit for encrypting PLD configuration data can include connection of the output of the terminating XOR logic gate to a third input of at least one XOR logic gate within the interlinked chain. Provision of the configuration signature data as the feedback signal further increases a difficulty level associated with deciphering the PLD configuration data stored in the various cells of the configuration memory.

In another aspect of the present embodiment, a plurality of destructible bypass connections can be included with the circuit for encrypting PLD configuration data. Each of the plurality of destructible bypass connections extends from the output of a respective configuration memory cell array to an output pin. Therefore, the plurality of destructible bypass connections enables direct access to the configuration data stored in each configuration memory cell array. In one embodiment, each of the destructible bypass connections is defined to include a fuse. The fuse in an intact state enables data transmission through the destructible bypass connection. The fuse in a blown state disables data transmission through the destructible bypass connection. Each fuse can be blown in a number of ways. For example, each fuse can be blown either by applying a sufficient current to the destructible bypass connection that includes the fuse, or through the appropriate application of a laser to the fuse. The plurality of destructible bypass connections can be destroyed prior to a non-secure release of the corresponding PLD. Upon destruction of the plurality of destructible bypass connections, the overall functionality of the PLD configuration memory can continue to be checked using the configuration signature data provided by the interlinked chain of XOR logic gates and registers.

In yet another embodiment, a method is disclosed for encrypting digital data to defend against reverse engineering of a circuit. The method includes a first operation for performing an XOR logic function on a pair of digital data signals to generate an XOR logic function output signal. In a second operation, an XOR logic function is performed on the previously generated XOR logic function output signal and another digital data signal to generate another XOR logic function output signal. A third operation provides for repeating the second operation such that each digital data signal to be encrypted has been processed once through an XOR logic function. In a fourth operation, a lastly generated XOR logic function output signal is provided as an encrypted signature. The encrypted signature corresponds to an expected digital logic state when each of the digital data signals processed through its respective XOR logic function is correct.

In another aspect of the present embodiment, the method can also include another operation for providing the lastly generated XOR logic function output signal as a feedback signal, wherein the feedback signal is to be used as a third input signal to at least one XOR logic function performed in the first, second, and third operations. Additionally, the method can include an operation for providing a destructible bypass connection to enable access to each digital data signal prior to processing of the digital data signal through an XOR logic function. An operation can also be provided for destroying each destructible bypass connection prior to a non-secure release of the circuit. In one implementation of the present embodiment, each digital data signal to be encrypted represents an output signal from a scan output chain of the circuit. In another implementation of the present embodiment, each digital data signal to be encrypted represents a configuration data signal for the circuit, wherein the circuit is defined within a PLD.

Other aspects and advantages of the invention will become more apparent from the following detailed description, taken in conjunction with the accompanying drawings, illustrating by way of example the present invention.

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

Figure 1:
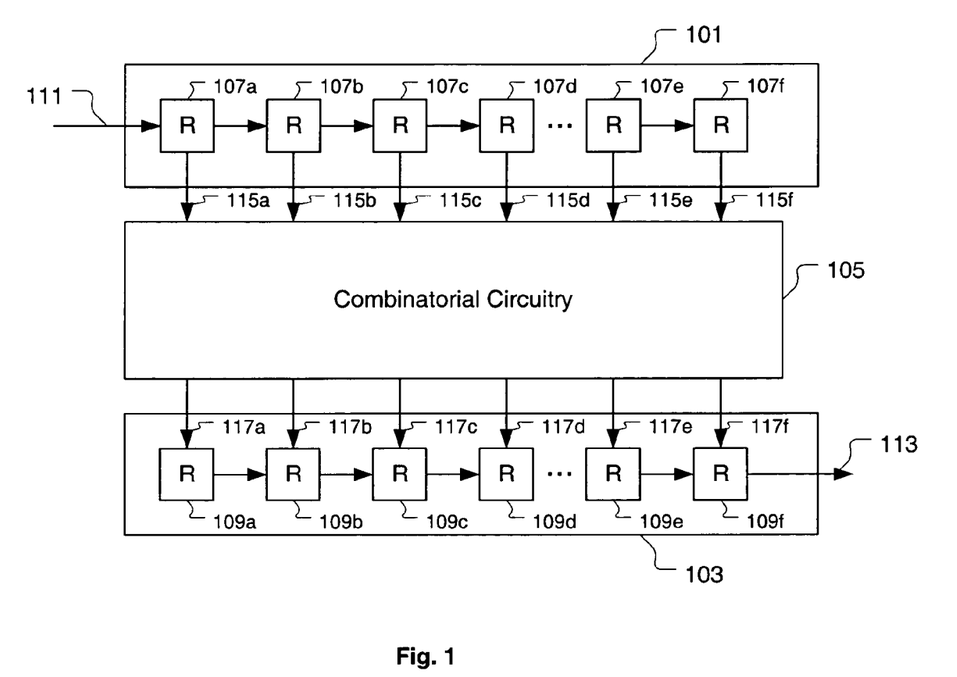
FIG. 1 is an illustration showing a portion of circuitry having an associated scan input chain and an associated scan output chain.

FIG. 1 is an illustration showing a portion of combinatorial circuitry 105 ("circuitry 105" hereafter) having an associated scan input chain 101 and an associated scan output chain 103. The scan input chain 101 and scan output chain 103 enable testing of the logic function defined by the circuitry 105. The scan input chain 101 includes a number of serially connected registers 107a-107f. It should be understood that the scan input chain 101 can include any number of registers as required by the logic function of the circuitry 105. More specifically, a register can be provided for each input required by the logic function of the circuitry 105.

During operation, input data is sequentially loaded, i.e., clocked, into the scan input chain through a connection 111. Once the necessary scan input data is loaded into each of the scan input chain 101 registers 107a-107f, the scan input data is simultaneously transmitted, i.e., clocked, from each register 107a-107f through a respective connection 115a-115f to the various inputs required by the logic function of the circuitry 105. Then, a sufficient number of functional clock cycles are performed to allow completion of the logic function of the circuitry 105. Upon completion of the logic function of the circuitry 105, each of the various outputs generated by the logic function of the circuitry 105 is transmitted, i.e., clocked, through a respective connection 117a-117f to a respective register 109a-109f in the scan output chain 103. It should be understood that the scan output chain 103 can include any number of registers as required by the logic function of the circuitry 105. More specifically, a register can be provided for each output generated by the logic function of the circuitry 105. The scan output data in the registers 109a-109f is then output through a connection 113 to be evaluated. If the scan output data matches the circuitry 105 logic function output expected for the scan input data, the circuitry 105 is considered to be defined and operating correctly. However, if the scan output data does not match the circuitry 105 logic function output expected for the scan input data, the circuitry 105 is considered to be faulty.

It should be appreciated that direct access to the output connection 113 of the scan output chain 103, enables access to each bit of scan output data. Such detailed access can support error correction within the circuitry 105, or at least identification of the failure mode of the circuitry 105. Unfortunately, however, such detailed access also leaves the logic function of the circuitry 105 vulnerable to reverse engineering. More specifically, it is feasible that by running a sufficient number of scan input data combinations through the circuitry 105 and examining the corresponding scan output data, the proprietary logic function of the circuitry 105 could be determined. Then, the exposed proprietary logic function of the circuitry 105 could be exploited by a malevolent entity.

Figure 2:
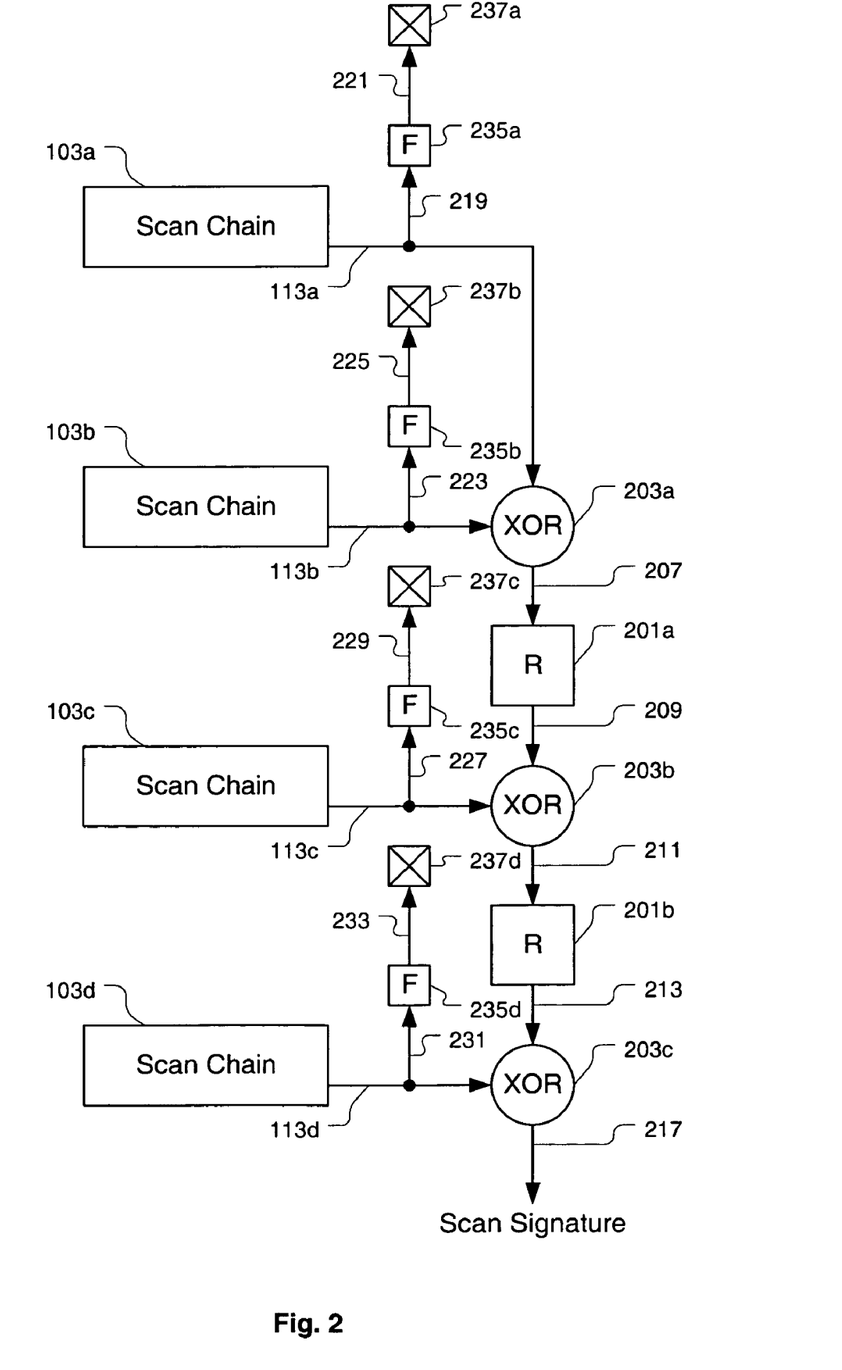
FIG. 2 is an illustration showing a circuit for encrypting scan data, in accordance with one embodiment of the present invention.

FIG. 2 is an illustration showing a circuit for encrypting scan data, in accordance with one embodiment of the present invention. The circuit of FIG. 2 is shown to include a number of scan output chains 103a-103d. For ease of discussion, FIG. 2 shows four scan output chains 103a-103d. However, it should be understood that the present invention can be implemented with any number of scan output chains. Each scan output chain 103a-103d depicted in FIG. 2 is the same as that previously described with respect to FIG. 1. Therefore, each scan output chain 103a-103d is defined to output scan output data through the connection 113a-113d, respectively. In one embodiment, each of the scan output chains 105a-105d is associated with a portion of circuitry in a programmable logic device (PLD).

The circuit of FIG. 2 also includes an interlinked chain of exclusive-or (XOR) logic gates 203a-203c and registers 201a-201b. The interlinked chain includes an originating XOR logic gate 203a having a first input connected to the output connection 113a of the scan output chain 103a, wherein the scan output chain represents an originating scan output chain in the exemplary embodiment of FIG. 2. The originating XOR logic gate 203a also includes a second input connected to the output connection 113b of the scan output chain 103b. An output 207 of the originating XOR logic gate 203a is connected to an input of the subsequently positioned register 201a. Additionally, an XOR logic gate 203b is defined to have a first input connected to an output 209 of the preceding register 201a. The XOR logic gate 203b is also defined to have a second input connected to the output connection 113c of the scan output chain 103c. An output 211 of the XOR logic gate 203b is connected to an input of the subsequently positioned register 201b.

The interlinked chain is further defined to include a terminating XOR logic gate 203c having a first input connected to an output 213 of the preceding register 201b. The terminating XOR logic gate 203c is defined to have a second input connected to the output connection 113d of the scan output chain 103d. An output 217 of the terminating XOR logic gate 203c is defined to provide scan signature data, wherein the scan signature data represents an encrypted version of the scan test output data transmitted from each scan output chain 103a-103d.

In one embodiment, each XOR logic gate and register within the interlinked chain of XOR logic gates and registers is defined to transmit a single bit logic signal on each of their respective inputs and outputs in accordance with a common clock signal. Thus, as the common clock signal cycles, data is shifted out of the number of scan output chains 103a-103d and through the interlinked chain of XOR logic gates and registers one bit per clock cycle.

The circuit of FIG. 2 also includes a number of destructible bypass connections extending from a respective scan output chain output connection 113a-113d to a respective output pin 237a-237d. More specifically, a destructible bypass connection defined by connections 219 and 221 and a fuse 235a extends from the scan output chain output connection 113a to the output pin 237a. Another destructible bypass connection defined by connections 223 and 225 and a fuse 235b extends from the scan output chain output connection 113b to the output pin 237b. Another destructible bypass connection defined by connections 227 and 229 and a fuse 235c extends from the scan output chain output connection 113c to the output pin 237c. Another destructible bypass connection defined by connections 231 and 233 and a fuse 235d extends from the scan output chain output connection 113d to the output pin 237d. It should be appreciated that each of the above-identified destructible bypass connections enables direct access to the scan test data output by its respective scan output chain. Thus, while a given destructible bypass connection is intact, scan output data can be directly accessed at the output connection of the corresponding scan output chain.

When each of the fuses 235a-235d is in an intact state, i.e., in the as-manufactured state, data transmission is enabled through the corresponding destructible bypass connection. When each of the fuses 235a-235d is in a blown state, data transmission is disabled through the corresponding destructible bypass connection. In one embodiment, the fuses are maintained in the intact state during manufacturing and testing of the various circuits 105a-105d. It should be appreciated that during manufacture and testing, the various circuits are within a secure environment safe from reverse engineering hackers. Prior to non-secure release of the device including the various circuits 105a-105d, the fuses 235a-235d are blown to permanently destroy the destructible bypass connections. In one embodiment, each fuse 235a-235d can be blown by applying a sufficient current to the destructible bypass connection that includes the fuse. In another embodiment, each fuse 235a-235d can be blown through the appropriate application of a laser to the fuse.

It should be appreciated that following the disablement of the destructible bypass connections, the combined functionality of the various circuits 105a-105d can continue to be tested through use of the scan signature generated by the interlinked chain of XOR logic gates and registers. More specifically, because the expected scan output data for a given set of scan input data is known and because the structure of the interlinked chain of XOR logic gates and registers is known, the resulting scan signature for the given set of scan input data is known. Therefore, the overall combined functionality of the circuits 105a-105d can be tested by observing the scan signature data corresponding to a given set of scan input data. However, it should be appreciated that with the destructible bypass connections disabled, the exact scan output data is inaccessible.

Figure 3A:
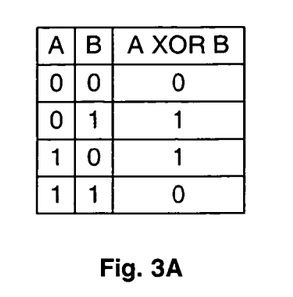
FIG. 3A is an illustration showing a truth table for a two-input XOR logic gate.
Figure 3B:
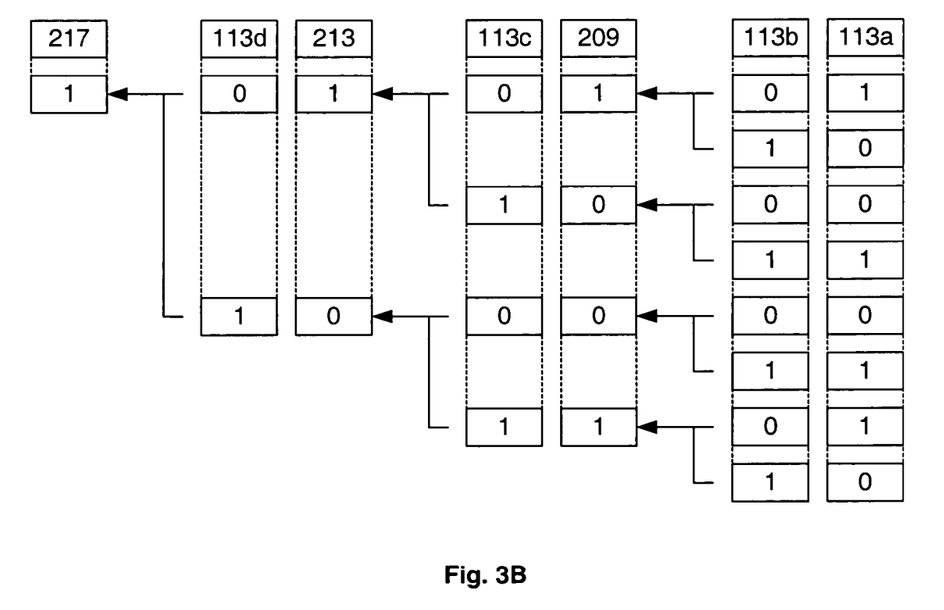
FIG. 3B is an illustration showing the various combinations of scan chain outputs that could be produced in the exemplary embodiment of FIG. 2 to yield a high logic state for a bit in the scan signature.

To reverse engineer the logic function of the various circuits 105a-105d using the scan signature, one would be faced with having to decipher the encryption provided by the interlinked chain of XOR logic gates and registers. Additionally, deciphering of the scan signature would require dealing with multiple logic functions of the various circuits that feed the interlinked chain of XOR logic gates and registers. FIGS. 3A-3B are provided to illustrate the complexity associated with deciphering the scan signature associated with even the simple example of FIG. 2.

FIG. 3A is an illustration showing a truth table for a two-input XOR logic gate. The truth table shows that there are two possible input combinations that yield a high logic state "1" output and two possible input combinations that yield a low logic state "0" output. Thus, a particular logic state output by each XOR logic gate in the interlinked chain of XOR logic gates and registers can be generated by either of two combinations of inputs. Therefore, if one were to attempt to backtrack through the interlinked chain of XOR logic gates and registers to determine the specific combination of scan chain outputs that combine to yield a particular logic state within the scan chain signature, each two-input XOR logic gate 203a-203c would represent a multiple of two in the number of possible scan chain output combinations.

FIG. 3B is an illustration showing the various combinations of scan chain outputs that could be produced in the exemplary embodiment of FIG. 2 to yield a high logic state "1" for a bit in the scan signature. Column 217 shows the high logic state "1" at the output 217 of the terminating XOR logic gate 203c. Columns 113d and 213 show the possible inputs that could be present on the output connection 113d of scan output chain 103d and on the output 213 of register 201b, respectively, to produce the high logic state "1" output from the terminating XOR logic gate 203c. Columns 113c and 209 show the possible inputs that could be present on the output connection 113c of scan output chain 103c and on the output 209 of register 201a, respectively, to produce either the high logic state "1" output or the low logic state "0" output from the XOR logic gate 203b. Columns 113b and 113a show the possible inputs that could be present on the output connection 113b of scan output chain 103b and on the output connection 113a of scan output chain 103a, respectively, to produce either the high logic state "1" output or the low logic state "0" output from the originating XOR logic gate 203a.

Based on the diagram of FIG. 3B, there are eight possible combinations of scan chain output signals that could combine to yield a high logic state "1" within the scan signature. It should be appreciated that the circuit of FIG. 2 is a simplified representation of the present invention in which just four scan output chains 103a-103d are fed into the interlinked chain of XOR logic gates and registers. In an actual implementation of the present invention there would be a large number of scan output chains feeding the interlinked chain of XOR logic gates and registers. If each XOR logic gate in the interlinked chain is a two-input XOR logic gate, the number of possible combinations of scan chain output signals that could yield a particular logic state within the scan signature is equal to $2^N$, where N is equal to the number of scan chain outputs feeding the interlinked chain of XOR logic gates and registers. Therefore, it should be appreciated that in an actual implementation that includes many scan output chains, it would be extremely difficult to decipher the scan signature to reverse engineer the logic function of a particular portion of circuitry.

Figure 4A:
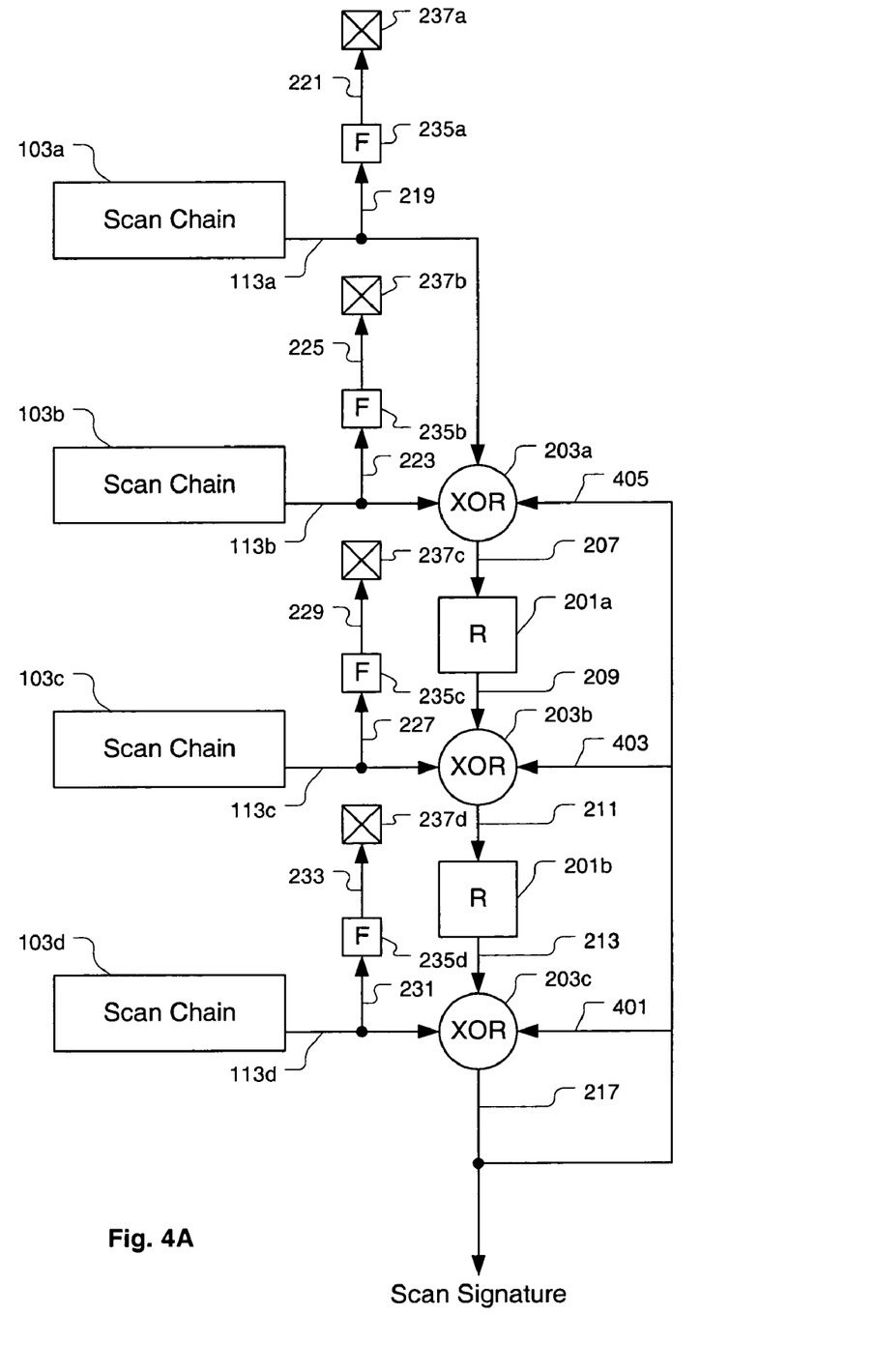
FIG. 4A is an illustration showing the circuit of FIG. 2 with an additional feedback input to the various XOR logic gates of the interlinked chain, in accordance with one embodiment of the present invention.

FIG. 4A is an illustration showing the circuit of FIG. 2 with an additional feedback input to the various XOR logic gates 203a-203c, in accordance with one embodiment of the present invention. Based on use of like reference numbers for like components, it should be appreciated that the circuit of FIG. 4A includes each component previously described with respect to FIG. 2. The circuit of FIG. 4A, however, also includes connection of the output of the terminating XOR logic gate 203c, i.e., the scan signature output to a third input of each XOR logic gate 203c, 203b, and 203a, as indicated by connections 401, 403, and 405, respectively. For descriptive purposes, the embodiment of FIG. 4A shows the output of the terminating XOR logic gate 203c connected to the third input of each XOR logic gate 203a-203c. However, it should be appreciated that in other embodiments, the output of the terminating XOR logic gate 203c can be connected to the third input of any number of XOR logic gates, so long as the output of the terminating XOR logic gate 203c is connected to the third input of at least one XOR logic gate in the interlinked chain of XOR logic gates and registers.

Figure 4B:
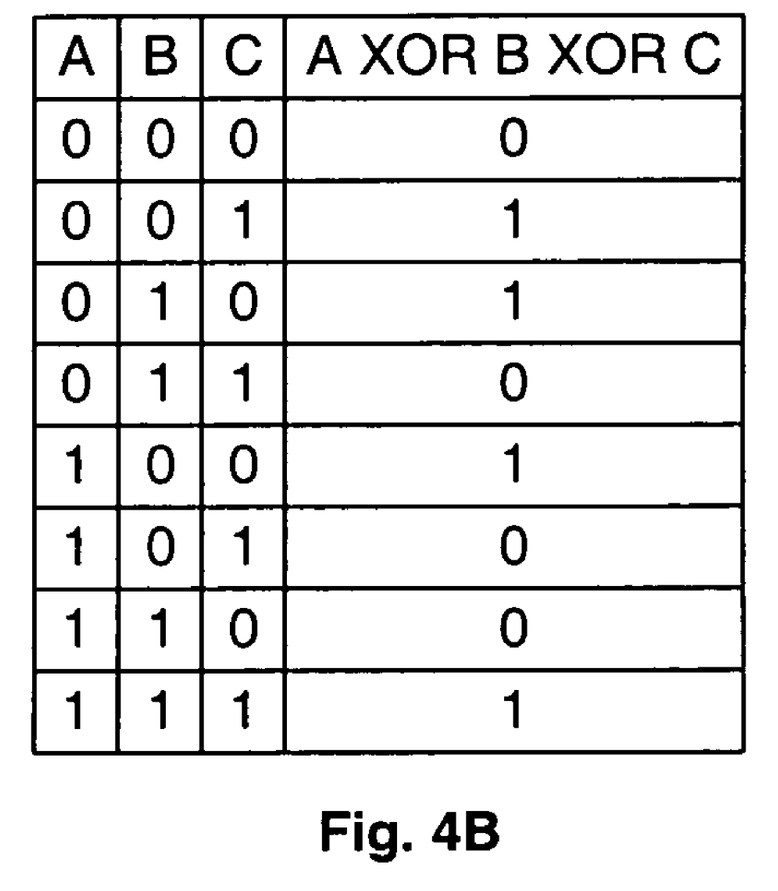
FIG. 4B is an illustration showing a truth table for a three-input XOR logic gate.

It should be appreciated that providing the lastly generated XOR logic function output signal as a feedback signal to the third input of at least one XOR logic gate serves to further increase the data tracking complexity associated with deciphering the scan signature. FIG. 4B is an illustration showing a truth table for a three-input XOR logic gate. The truth table shows that there are four possible input combinations that yield a high logic state "1" output and four possible input combinations that yield a low logic state "0" output. Thus, in the embodiment of FIG. 4A, a particular logic state output by each XOR logic gate 203a-203c can be generated by either of four combinations of inputs. However, because of the visibility of the lastly generated XOR logic function output signal, i.e., the feedback signal, the four possible combinations of inputs that can produce a particular logic state output from a given XOR logic gate 203a-203c actually is reduced to two unknown possible combinations of inputs. Therefore, if one were to attempt to backtrack through the interlinked chain of XOR logic gates and registers to determine the specific combination of scan chain outputs that combined to yield a particular logic state within the scan chain signature, the number of possible combinations of signals that could yield a particular logic state within the scan signature is equal to $2^N$, where N is equal to the number of scan chain outputs feeding the interlinked chain of XOR logic gates and registers.

It should be appreciated that the interlinked chain of XOR logic gates and registers as described with respect to FIGS. 2 and 4A provides a strong encryption of the security sensitive scan output data associated with various portions of circuitry. Additionally, it should be appreciated that provision of the destructible bypass connections enables direct access to the scan output data in the secure manufacturing environment, while also enabling permanent encryption-only access to the scan output data in non-secure environments. The circuitry of FIGS. 2 and 4A for encrypting the scan output data can also be used to encrypt other types of security sensitive data. For example, as discussed below, an interlinked chain of XOR logic gates and registers can be used to encrypt configuration data of a PLD.

PLDs are integrated circuit devices where the logic elements may be customized by a user. A customized PLD may be used to perform customized logic functions when the device is operated in a system. To customize a PLD, the device is loaded with configuration information, also referred to as programming data. The programming data may be stored in a flash memory chip, disk drive, or other storage device in the system. Upon power-up, the programming data may be loaded from the flash memory chip or other storage device into configuration random-access memory (CRAM) cells on the PLD. The output of each CRAM cell is either a high logic state "1" signal or a low logic state "0" signal, depending on the value of the programming data bit stored within the CRAM cell.

The output signal from each CRAM cell may be used to control a corresponding circuit element. The circuit element may be, for example, a pass transistor, a transistor in a logic component, such as a multiplexer or demultiplexer, a transistor in a look-up table, or a transistor or other programmable circuit element in any suitable configurable logic circuit. For example, when the gate of an n-channel metal-oxide-semiconductor (NMOS) transistor that is controlled by a CRAM cell is driven high (because the CRAM cell contains a high logic state "1" signal), the transistor is turned on so that signals can pass between its drain and source terminals. Alternatively, when the gate of the NMOS transistor is driven low (because the CRAM cell contains a low logic state "0" signal), the transistor is turned off. In this way, the transistors on the PLD and the functionality of the logic on the PLD can be configured.

It should be appreciated that given knowledge of the unconfigured architecture of the PLD, one could use the configuration data stored in the various CRAM cells of the PLD to identify the logic function and circuit layout of the configured PLD. Therefore, direct exposure of the configuration data stored in the various CRAM cells could enable a malevolent entity to steal or exploit the logic of the configured PLD. While direct exposure of the configuration data stored in the various CRAM cells is undesirable, a capability is also needed for checking the configuration data stored in the various CRAM cells.

Figure 5A:
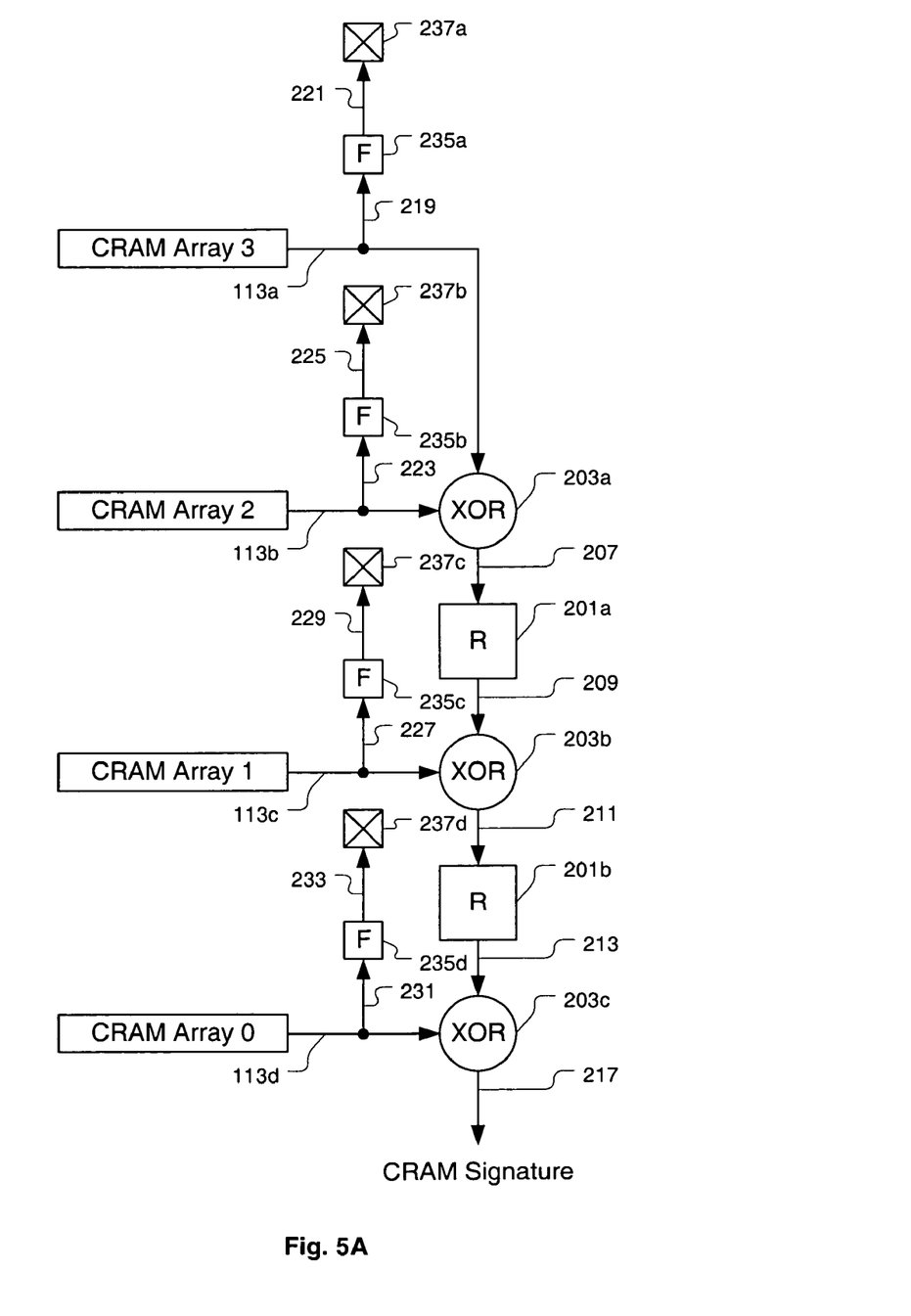
FIG. 5A is an illustration showing a circuit for encrypting configuration data stored in CRAM cells of a PLD, in accordance with one embodiment of the present invention.

FIG. 5A is an illustration showing a circuit for encrypting configuration data stored in CRAM cells of a PLD, in accordance with one embodiment of the present invention. Based on use of like reference numbers for like components, it should be appreciated that the circuit of FIG. 5A includes each component previously described with respect to FIG. 2. However, the inputs of the XOR logic gates 203a-203c in the embodiment of FIG. 5A are defined to receive the configuration data signals from various CRAM arrays in the configuration memory of the PLD, wherein each CRAM array includes a number of interconnected CRAM cells.

The circuit of FIG. 5A includes the destructible bypass connections extending from respective CRAM array output connections 113a-113d to respective output pins 237a-237d. It should be appreciated that each of the destructible bypass connections enables direct access to the configuration data within the CRAM arrays. Thus, while a destructible bypass connection is intact, configuration data can be directly accessed at the output connection of the corresponding CRAM array. Once the destructible bypass connection is permanently disabled, the configuration data can no longer be directly accessed. However, it should be appreciated that following the disablement of the destructible bypass connections, the configuration data can continue to be tested in an integral manner through use of the CRAM signature generated by the interlinked chain of XOR logic gates and registers. To reverse engineer the configuration data using the CRAM signature, one would be faced with having to decipher the encryption provided by the interlinked chain of XOR logic gates and registers.

Figure 5B:
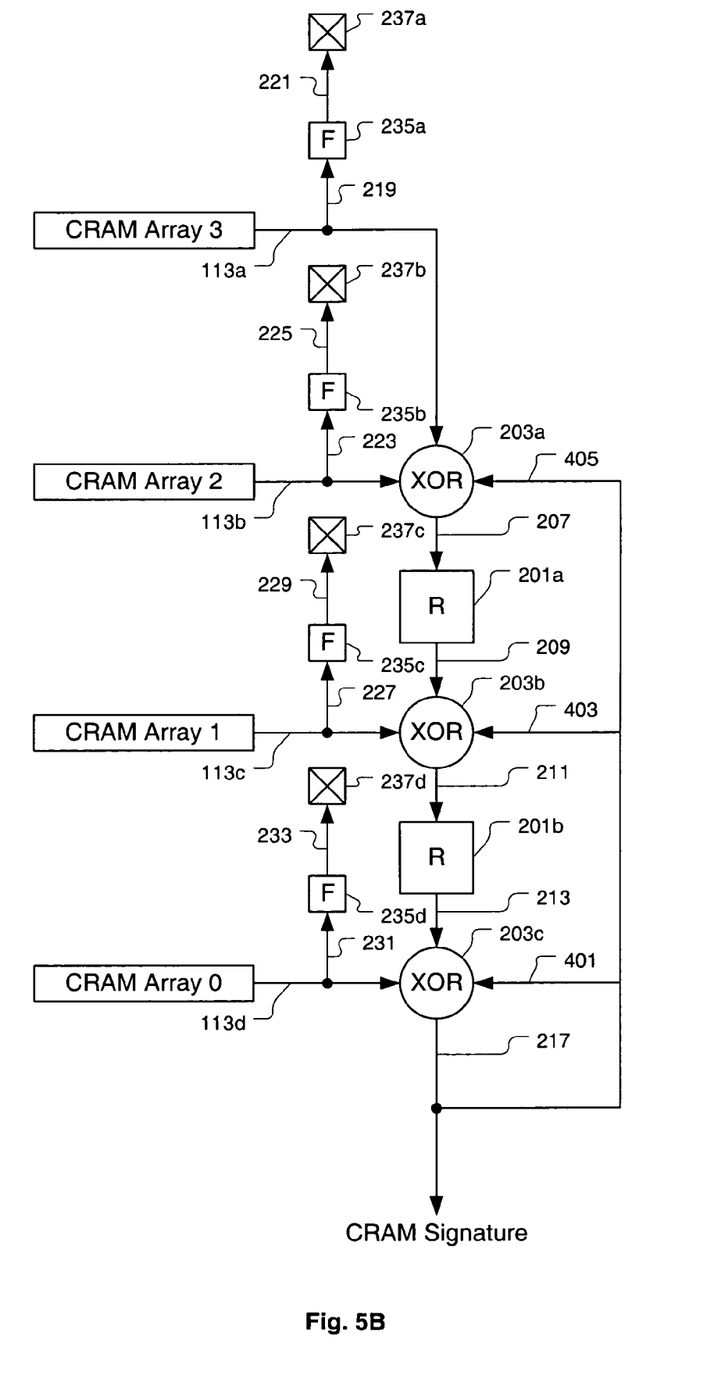
FIG. 5B is an illustration showing the circuit of FIG. 5A with an additional feedback input to the various XOR logic gates of the interlinked chain, in accordance with one embodiment of the present invention.

FIG. 5B is an illustration showing the circuit of FIG. 5A with an additional feedback input to the various XOR logic gates 203a-203c, in accordance with one embodiment of the present invention. Based on use of like reference numbers for like components, it should be appreciated that the circuit of FIG. 5B includes each component previously described with respect to FIG. 4A. Providing the lastly generated XOR logic function output signal as a feedback signal to the third input of at least one XOR logic gate serves to further increase the data tracking complexity associated with deciphering the CRAM signature. As previously discussed with respect to FIG. 4A, in the embodiment where the feedback signal is connected to the third input of each XOR logic gate, the number of possible combinations of signals that could combine to yield a particular logic state within the CRAM signature is equal to $2^N$, where N is equal to the number of CRAM cells feeding the interlinked chain of XOR logic gates and registers.

Figure 6:
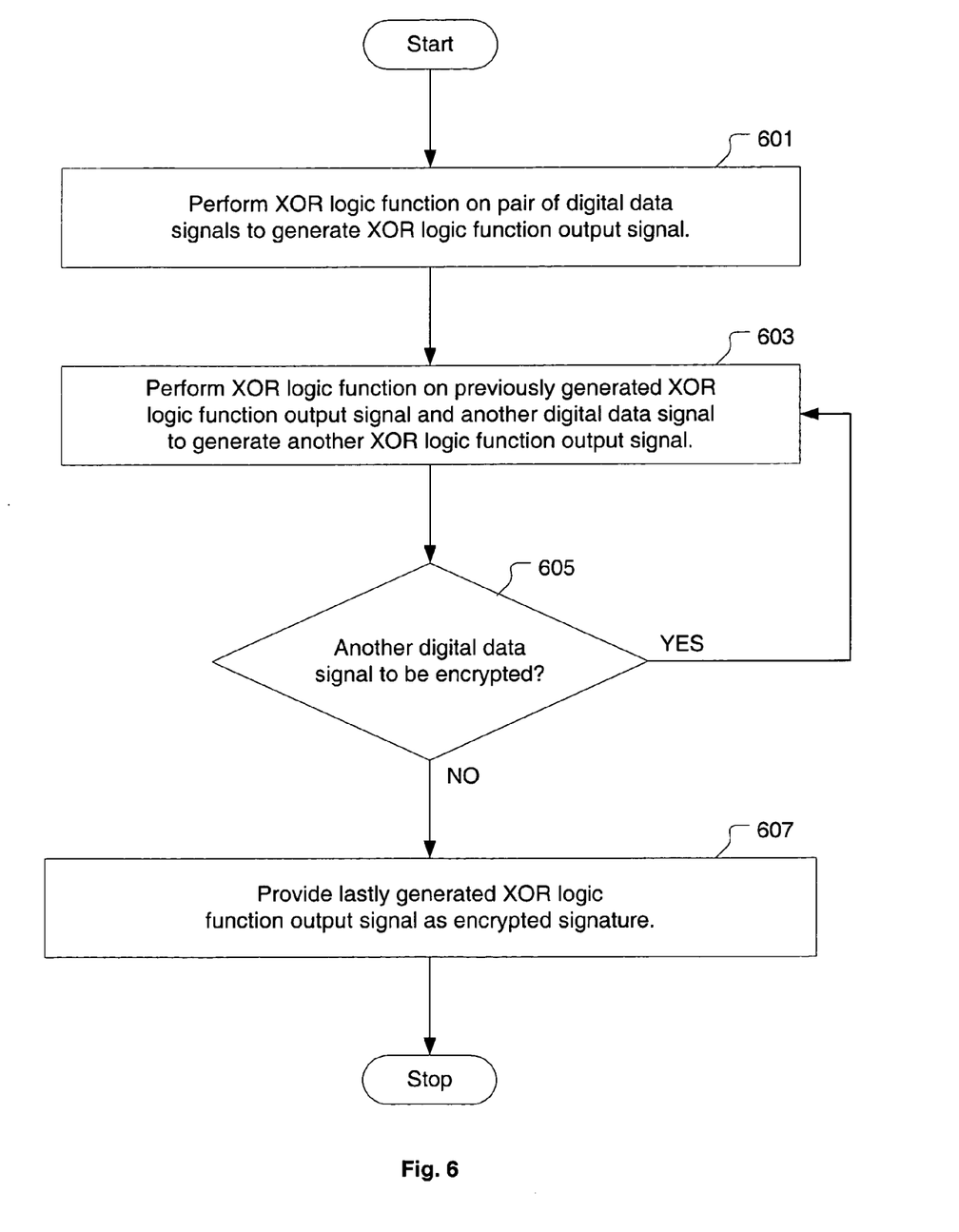
FIG. 6 is an illustration showing a flowchart of a method for encrypting digital data to defend against reverse engineering of a circuit, in accordance with one embodiment of the present invention.

FIG. 6 is an illustration showing a flowchart of a method for encrypting digital data to defend against reverse engineering of a circuit, in accordance with one embodiment of the present invention. The method includes a first operation 601 for performing an XOR logic function on a pair of digital data signals to generate an XOR logic function output signal. The method then proceeds with an operation 603 for performing an XOR logic function on the previously generated XOR logic function output signal and another digital data signal to generate another XOR logic function output signal. Then, in an operation 605, a determination is made as to whether or not another digital data signal is to be encrypted. It should be appreciated that each digital data signal to be encrypted is to be processed once through the XOR logic function. If operation 605 identifies another digital data signal to be encrypted, the method proceeds with re-performing operation 603 using the identified digital data signal. Otherwise, if operation 605 does not identify another digital data signal to be encrypted, the method proceeds to an operation 607. In operation 607, a lastly generated XOR logic function output signal is provided as an encrypted signature. The encrypted signature corresponds to an expected digital logic state when each of the digital data signals processed through the XOR logic function is correct.

In one embodiment, the method includes an additional operation for providing the lastly generated XOR logic function output signal as a feedback signal. More specifically, the feedback signal is provided as a third input signal to at least one XOR logic function performed in operations 601 and 603. In a particular embodiment, the feedback signal can be provided as a third input signal to each XOR logic function performed in operations 601 and 603.

Additionally, in one embodiment, the method includes an operation for providing a destructible bypass connection to enable access to each digital data signal prior to processing of the digital data signal through the XOR logic function. Thus, in a secure environment, the various destructible bypass connections can be used to directly examine individual digital data signals. This embodiment also includes an operation for destroying each destructible bypass connection prior to a non-secure release of the circuit. Thus, following the non-secure release of the circuit, access to the individual digital data signals is unavailable. Therefore, a malevolent entity will be confronted with the essentially impossible challenge of deciphering the encrypted digital data in order to reverse engineer the circuit. It should be appreciated that the method of FIG. 6 can be applied to many types of security sensitive data. In a particular embodiment, each digital data signal to be encrypted represents an output signal from a scan output chain of the circuit. In another embodiment, each digital data signal to be encrypted represents a configuration data signal for the circuit, wherein the circuit is defined within a PLD.

The method and circuitry for encrypting security sensitive data as described herein may be incorporated into a PLD. The PLD may be part of a data processing system that includes one or more of the following components: a processor, memory, input/output (I/O) circuitry, and peripheral devices. The data processing system can be used in a wide variety of applications, such as computer networking, data networking, instrumentation, video processing, digital signal processing, or any other suitable application where the advantage of using programmable or re-programmable logic is desirable. The PLD can be used to perform a variety of different logic functions. For example, the PLD can be configured as a processor or controller that works in cooperation with a system processor. The PLD may also be used as an arbiter for arbitrating access to a shared resource in the data processing system. In yet another example, the PLD can be configured as an interface between a processor and one of the other components in the system.

While this invention has been described in terms of several embodiments, it will be appreciated that those skilled in the art upon reading the preceding specifications and studying the drawings will realize various alterations, additions, permutations and equivalents thereof. Therefore, it is intended that the present invention includes all such alterations, additions, permutations, and equivalents as fall within the true spirit and scope of the invention.

What is claimed is:

1. A circuit for encrypting scan data, comprising:
an interlinked chain of exclusive-or logic gates and registers, wherein a first input of each exclusive-or logic gate is connected to an output of a preceding register and an input of each register is connected to an output of a preceding exclusive-or logic gate; and
a plurality of scan output chains, each of the plurality of scan output chains having an output connected to a second input of a respective exclusive-or logic gate within the interlinked chain of exclusive-or logic gates and registers,
wherein the interlinked chain of exclusive-or logic gates and registers includes an originating exclusive-or logic gate having its first input connected to an output of an originating scan output chain rather than to a preceding register, the interlinked chain of exclusive-or logic gates and registers including a terminating exclusive-or logic gate having an output defined to provide scan signature data, the scan signature data representing an encrypted version of scan test data output by each scan output chain.

2. A circuit for encrypting scan data as recited in claim 1, further comprising:
a plurality of destructible bypass connections, each of the plurality of destructible bypass connections extending from the output of a respective one of the plurality of scan output chains to an output pin, the plurality of destructible bypass connections enabling direct access to the scan test data output by each scan output chain.

3. A circuit for encrypting scan data as recited in claim 2, wherein the each of the plurality of destructible bypass connections is defined to include a fuse, wherein the fuse in an intact state enables data transmission through the destructible bypass connection and the fuse in a blown state disables data transmission through the destructible bypass connection.

4. A circuit for encrypting scan data as recited in claim 3, wherein each fuse is defined to be blown either by applying a sufficient current to the destructible bypass connection that includes the fuse or by applying a laser to the fuse.

5. A circuit for encrypting scan data as recited in claim 1, wherein each of the plurality of scan output chains is associated with a portion of circuitry in a programmable logic device (PLD), each of the plurality of scan output chains and its associated portion of circuitry having an corresponding scan input chain, the scan input and output chains enabling testing of the associated portions of circuitry within the PLD.

6. A circuit for encrypting scan data as recited in claim 1, wherein each exclusive-or logic gate and register within the interlinked chain of exclusive-or logic gates and registers is defined to transmit a single bit logic signal on each of their respective inputs and outputs in accordance with a common clock signal.

7. A circuit for encrypting scan data as recited in claim 1, wherein the output of the terminating exclusive-or logic gate is connected to a third input of at least one exclusive-or logic gate within the interlinked chain of exclusive-or logic gates and registers.

8. A circuit for encrypting configuration data of a programmable logic device (PLD), comprising:
an interlinked chain of exclusive-or logic gates and registers, wherein a first input of each exclusive-or logic gate is connected to an output of a preceding register and an input of each register is connected to an output of a preceding exclusive-or logic gate; and
a plurality of configuration memory cell arrays, each of the plurality of configuration memory cell arrays having an output connected to a second input of a respective exclusive-or logic gate within the interlinked chain of exclusive-or logic gates and registers,
wherein the interlinked chain of exclusive-or logic gates and registers includes an originating exclusive-or logic gate having its first input connected to an output of an originating configuration memory cell array rather than to a preceding register, the interlinked chain of exclusive-or logic gates and registers including a terminating exclusive-or logic gate having an output defined to provide configuration signature data, the configuration signature data representing an encrypted version of configuration data output by each configuration memory cell array.

9. A circuit for encrypting configuration data of a PLD as recited in claim 8, further comprising:
a plurality of destructible bypass connections, each of the plurality of destructible bypass connections extending from the output of a respective one of the plurality of configuration memory cell arrays to an output pin, the plurality of destructible bypass connections enabling direct access to the configuration data output by each configuration memory cell array.

10. A circuit for encrypting configuration data of a PLD as recited in claim 9, wherein the each of the plurality of destructible bypass connections is defined to include a fuse, wherein the fuse in an intact state enables data transmission through the destructible bypass connection and the fuse in a blown state disables data transmission through the destructible bypass connection.

11. A circuit for encrypting configuration data of a PLD as recited in claim 10, wherein each fuse is defined to be blown either by applying a sufficient current to the destructible bypass connection that includes the fuse or by applying a laser to the fuse.

12. A circuit for encrypting configuration data of a PLD as recited in claim 8, wherein each exclusive-or logic gate and register within the interlinked chain of exclusive- or logic gates and registers is defined to transmit a single bit logic signal on each of their respective inputs and outputs in accordance with a common clock signal.

13. A circuit for encrypting configuration data of a PLD as recited in claim 8, wherein the output of the terminating exclusive-or logic gate is connected to a third input of at least one exclusive-or logic gate within the interlinked chain of exclusive-or logic gates and registers.

14. A circuit for encrypting configuration data of a PLD as recited in claim 13, wherein the output of the terminating exclusive-or logic gate is connected to a third input of each exclusive-or logic gate within the interlinked chain of exclusive-or logic gates and registers.

15. A method for encrypting digital data to defend against reverse engineering of a circuit, comprising:
  a) performing an exclusive-or logic function on a pair of digital data signals to generate an exclusive-or logic function output signal;
  b) performing an exclusive-or logic function on the previously generated exclusive-or logic function output signal and another digital data signal to generate another exclusive-or logic function output signal;
  c) repeating operation b) such that each digital data signal to be encrypted has been processed once through the exclusive-or logic function; and
  d) providing a lastly generated exclusive-or logic function output signal as an encrypted signature, the encrypted signature corresponding to an expected digital logic state when each of the digital data signals processed through the exclusive-or logic function is correct.

16. A method for encrypting digital data to defend against reverse engineering of a circuit as recited in claim 15, wherein each digital data signal to be encrypted represents an output signal from a scan output chain of the circuit.

17. A method for encrypting digital data to defend against reverse engineering of a circuit as recited in claim 15, wherein each digital data signal to be encrypted represents a configuration data signal for the circuit, wherein the circuit is defined within a programmable logic device.

18. A method for encrypting digital data to defend against reverse engineering of a circuit as recited in claim 15, further comprising:
  providing the lastly generated exclusive-or logic function output signal as a feedback signal to be used as a third input signal to at least one exclusive-or logic function performed in operations a), b), and c).

19. A method for encrypting digital data to defend against reverse engineering of a circuit as recited in claim 15, further comprising:
  providing a destructible bypass connection to enable access to each digital data signal prior to processing of the digital data signal through an exclusive-or logic function.

20. A method for encrypting digital data to defend against reverse engineering of a circuit as recited in claim 19, further comprising:
  destroying each destructible bypass connection prior to a non-secure release of the circuit.

* * * * *